(12) United States Patent  
Haley

(10) Patent No.: US 7,246,326 B2  
(45) Date of Patent: Jul. 17, 2007

(54) SYSTEM AND PROCEDURE FOR PROVIDING A USER INTERFACE DISPLAY

(75) Inventor: John D. Haley, Honey Brook, PA (US)

(73) Assignee: Siemens Medical Solutions Health Services Corporation, Malvern, PA (US)

( * ) Notice: Subject to any disclaimer, the term of this patent is extended or adjusted under 35 U.S.C. 154(b) by 1151 days.

(21) Appl. No.: 10/116,774

(22) Filed: Apr. 4, 2002

(65) Prior Publication Data

US 2003/0025693 A1 Feb. 6, 2003

Related U.S. Application Data

(60) Provisional application No. 60/300,738, filed on Jun. 25, 2001.

(51) Int. Cl.
G06F 3/048 (2006.01)
G06F 3/14 (2006.01)

(52) U.S. Cl. ............... 715/762; 715/760; 715/749; 715/764; 715/513

(58) Field of Classification Search ............ 715/760, 715/780, 762, 744, 788, 798, 800, 781, 764, 715/748, 749, 733, 513, 514, 517, 520
See application file for complete search history.

(56) References Cited

U.S. PATENT DOCUMENTS

| | | | | |
|---|---|---|---|---|
| 5,454,072 A | | 9/1995 | Aoyama ............... 395/146 |
| 5,721,848 A | * | 2/1998 | Joseph ............... 715/764 |
| 5,900,868 A | | 5/1999 | Duhault et al. ......... 345/327 |
| 5,973,691 A | | 10/1999 | Servan-Schreiber ...... 345/342 |
| 5,990,898 A | | 11/1999 | Urano ............... 345/426 |
| 6,002,446 A | | 12/1999 | Eglit ............... 348/581 |
| 6,069,606 A | | 5/2000 | Sciammarella et al. ..... 345/127 |
| 6,130,723 A | | 10/2000 | Medin ............... 348/607 |
| 6,204,887 B1 | | 3/2001 | Hiroi ............... 348/565 |
| 6,310,601 B1 | * | 10/2001 | Moore et al. ......... 345/660 |
| 6,341,183 B1 | | 1/2002 | Goldberg ............. 382/276 |
| 6,353,448 B1 | * | 3/2002 | Scarborough et al. ...... 715/744 |
| 6,390,371 B1 | * | 5/2002 | Armga et al. ......... 235/472.01 |
| 6,456,305 B1 | * | 9/2002 | Qureshi et al. ......... 715/800 |
| 6,476,828 B1 | * | 11/2002 | Burkett et al. ......... 715/760 |
| 6,750,887 B1 | * | 6/2004 | Kellerman et al. ....... 715/788 |
| 6,791,571 B1 | * | 9/2004 | Lamb ............... 715/513 X |
| 2001/0011364 A1 | | 8/2001 | Stoub ............... 717/1 |
| 2002/0000998 A1 | | 1/2002 | Scott et al. ............ 345/667 |
| 2002/0191027 A1 | * | 12/2002 | Morrow et al. ........ 345/788 |
| 2005/0251742 A1 | * | 11/2005 | Mogilevsky et al. ... 715/513 X |

\* cited by examiner

*Primary Examiner*—Raymond J. Bayeri
(74) *Attorney, Agent, or Firm*—Alexander J. Burke

(57) ABSTRACT

A system customizes and generates data representing an electronic form for storage on a target workstation ready for use prior to execution time of a procedure used to generate the form. An adaptive user interface generator generates code representing an executable procedure for use in providing a user interface display including a plurality of displayed user interface display elements. A source of presentation control information determines a user interface presentation format of a display image capable of being adaptively scaled to fit different display image sizes. The presentation control information specifies relative location and size of the interface display elements. A transformation processor transforms the presentation control information into executable procedure representative code for use in providing a user interface display image with a format suitable for a desired display size. The source of presentation control information determines the user interface presentation format of the display image exclusive of data identifying absolute image display element positions in the display image.

23 Claims, 7 Drawing Sheets

The ControlGroup component automatically aligns UI components with their corresponding labels. The UI component and it's label are always in the same column.

A ControlGroup with
1 Column

A ControlGroup with
2 Columns

| Property Name | Default Value | Description |
|---|---|---|
| NumberOfColumns | 1 | This property specifies the number of cells per row. Setting this property to a value of three would create three cells per row. |
| CellPadding | | This property specifies the amount of space, in pixels, between the border of the cell and the content of the cell. |
| CellSpacing | | This property specifies the amount of space, in pixels, between cells. |
| ColumnStyle | | The ColumnStyle property allows DHTML styles to be applied to all columns in the control group. This will allow for more control over spacing of the columns. For example "padding:'1px 5px' will allow for 1 pixel of top and bottom spacing, and 5 pixels of left and right spacing. The ColumnStyle can be used to add more left and right padding while keeping the current top and bottom padding to 1. Vertical padding can also be set to 0 which will pack fields together more vertically. |
| Scroll | false | This property specifies whether this ControlGroup will present a scroll bar if the content exceeds the height and/or width of the ControlGroup. A value of "true" causes the ControlGroup to create cells that are as wide as necessary, but to display a horizontal control bar if the resulting column is wider than "ColWidth". The same applies to the height of cells and columns. A value of "false" causes the Control Group to truncate some controls (e.g. buttons) or wrap label text and make the cell taller. This property should be set to "true" if the space that the ControlGroup occupies is fixed regardless of the space required by its contained controls. |
| ColWidth | | This property specifies the width of each column as a percetage ("%") of the space allocated to this ControlGroup. Multiple column widths must be specified using a comma delimited string and the number of width specifications in this string must be equal to the value of the "NumberOfColumns" property. The sum of all widths must be 100%. If this is not specified, the ControlGroup is divided into columns of equal width. For example, for a ControlGroup with the NumberOfColumns set to three, a valid ColWidth specification would be "30%, 40%, 30%". |
| ChildLabelWidth | 50% | This property specifies the width of the space allocated to each contained control's label as a percentage ("%") of the width of the cell assigned to each control. The format must be comma delimited string containing either one value to be applied to all child labels, or containing "NumberOfColumns" values to be applied to each column. If not specified, a label width of "50%" of the cell's width is used. For example, for a ControlGroup with the NumberOfColumns set to three, the ChildLabelWidth must be of the form "50%" or of the form "10%, 40%, 30%". |

FIG. 5

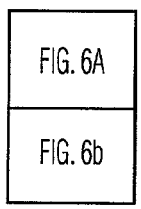

FIG. 6

| Property Name | Description |
|---|---|
| Id | This property specifies a unique identifier for the component.<br>Note: Upon generation, the Generator will prepend the string "ctl" to the Identifier. Therefore, any references to this Id within Javascript must have the generated Id name. For example, "PatientName" becomes "ctlPatientName" after code generation. |
| Display | This property specifies whether or not the component is visible. |
| Disabled | This property specifies whether or not the component is disabled. |
| DisplayLabel | This property specifies whether or not a label is displayed along side of the component.<br>Note: The text string for the label is derived from the label associated with the current language context. In the case that there is no defined label, then the "Id" name of component is used by default. |
| TabIndex | This property specifies the tab key sequence. |
| ColSpan | This property specifies the number of columns for this component to span. |
| Align | This property specifies the alignment of the component within the parent component. The allowable values for this property are: |
| | left - aligns the component at the left. |
| | center - aligns the component at the center. |
| | right - aligns the component at the right. |
| LabelAlign | This property specifies the alignment of the component's label within the parent component. The allowable values for this property are: |
| | left - aligns the component at the left. |
| | center - aligns the component at the center. |
| | right - aligns the component at the right. |
| VerticalAlign | This property specifies the vertical alignment of the component's label within the parent component. The allowable values for this property are: |
| | top - aligns the component at the top. |
| | middle - aligns the component at the center. |
| | bottom - aligns the component at the bottom. |
| LabelOnTop | This property specifies whether or not the label is displayed to the left of the component or on top of the component. The allowable values for this property are: |
| | true - aligns the component label on top of the component. |
| | false - aligns the component label to the left of the component. |
| ClassName | This property is used to associate a particular style rule in a style sheet with the component. |
| Style | This property specifies the inline style for the component.<br>Note: This will override any conflicting styles/rules enforced by the ClassName of the component |
| LabelClassName | This property is used to associate a particular style rule in a style sheet with the component's label. |

FIG. 6A

| | | |
|---|---|---|
| 229 | LabelStyle | This property specifies the inline for the component's label. |
| | | Note: This will override any conflicting styles/rules enforced by the ClassName of the component's label. |
| 231 | LabelWidth | This property specifies the width of the component's label in either pixels or a percentage of the width of the parent component. |
| 236 | ControlWidth | This property specifies the width of the component in either pixels or a percentage of the width of the parent component. |
| 237 | ControlHeight | This property specifies the height of the component in pixels |
| 239 | Data Source | This property specifies the XQL with which to bind data to this component. |

FIG. 6B

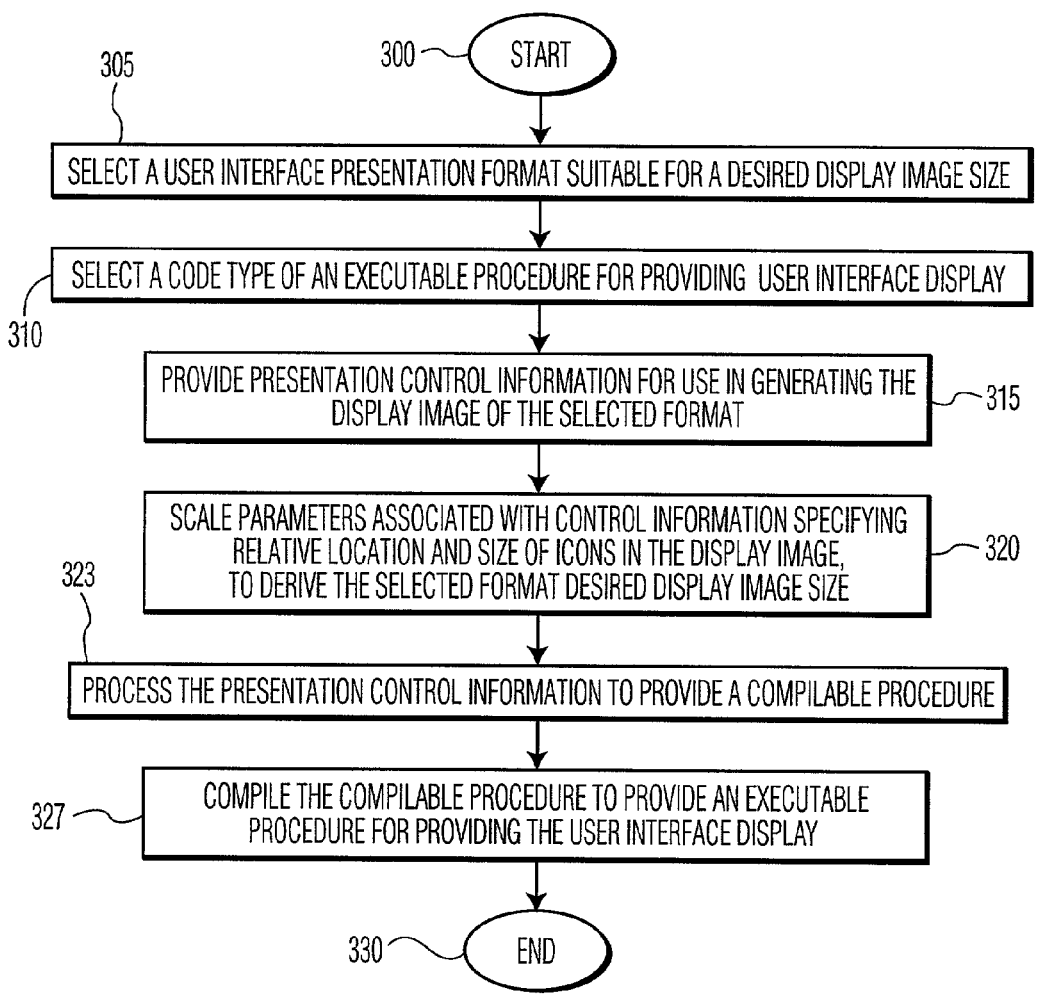

```
<PresentationSpec DataSpec="ControlGroup.Patent">
<BOForm Id="BOForm">
<ControlGroup Id="ControlGroup" NumberOfColumns=1 ColSpan=1 CellPadding=1 Scroll="false"
    DisplayLabel="true" Align="left" LabelAlign="left" LabelClassName="subSectionHead">
<Label Id="Label" ColSpan="1" Align="left" VerticalAlign="middle"
    Style="background-color:"#00D000""/>
<ComboBox Id="ComboBox" DisplayLabel="true" ColSpan=1 Size=15 Align="left" Datasource="gender"/>
<CheckBox Id="CheckBox" Disabled="false" ColSpan=1 Align="left" LabelStyle="background-color=#00D000"/>
<Button Id="Button" DisplayLabel="true" DisplayButtonText="true" ColSpan=1 Align="left" LabelAlign="left"/>
</ControlGroup>
</BOForm>
</PresentationSpec>
```

850

SYSTEM AND PROCEDURE FOR PROVIDING A USER INTERFACE DISPLAY

This is a non-provisional application of provisional application Ser. No. 60/300,738 by J. D. Haley filed Jun. 25, 2001.

FIELD OF THE INVENTION

This invention concerns a system for use in providing an executable procedure for generating a user interface display image (showing a form, for example) with a format suitable for a desired display size.

BACKGROUND OF THE INVENTION

In order to adapt a business or other software application to a particular computer system environment it is commonly necessary to generate a customized user interface for use in acquiring data from a user or to display data to a user. Such a customized user interface display typically involves adapting or tailoring an existing electronic form to march particular requirements and a different image size, for example. Some known systems customize an existing electronic form dynamically at a run-time (execution time) of a procedure employing the desired user interface form. As an example, a system based on Microsoft XSL (Extensible Stylesheet Language) typically outputs an HTML (Hypertext Markup Language) code representative form for display on a user workstation at run-time. Extensible Stylesheet Language (XSL) is a language for expressing stylesheets. It contains XSL Transformations (XSLT); a language for transforming XML documents. This type of XSL-based system takes one XML file (in addition to the XSL transforming file itself) as input and outputs a single XML file. XML (Extensible Markup Language) is used to encode structured data passed between computer systems and is determined by a standard maintained by the World Wide Web Consortium.

However, there is a problem involved in systems that customize and generate electronic user interface forms at run-time. Specifically, the length of time it takes to produce a form is dependent on the complexity of the transformation performed (and existing form customization) that occurs at run-time. Further, because of processing time constraints, run-time form generation systems are typically limited in their form customization and generation capabilities. Such systems are typically limited in the range of form representative code output formats that may be employed and are usually restricted to form output in HTML or XML code representative format, for example. Other problems of existing electronic form customization and generation systems include lack of flexibility in accommodating country specific requirements (e.g., different languages such as French, Japanese . . . etc.) and new hardware architectures. Existing systems also typically do not readily accommodate change in desired system response upon user selection of form prompts, icons or other user interactive displayed elements. A system according to invention principles addresses these deficiencies and derivative deficiencies.

SUMMARY OF INVENTION

A system customizes and generates data representing an electronic form for storage on a target workstation ready for use prior to execution time of a procedure used to generate the form. An adaptive user interface generator generates code representing an executable procedure for use in providing a user interface display including a plurality of displayed user interface display elements. A source of presentation control information determines a user interface presentation format of a display image capable of being adaptively scaled to fit different display image sizes. The presentation control information specifies relative location of the interface display elements. A transformation processor transforms the presentation control information into executable procedure representative code for use in providing a user interface display image with a format suitable for a desired display size.

BRIEF DESCRIPTION OF THE DRAWING

FIG. 5 shows properties of presentation control information code structure elements employed in generating an electronic form, according to invention principles.

FIGS. 6A and 6B comprise a table showing common properties of presentation control information code structure elements employed in generating an electronic form, according to invention principles.

FIG. 7 shows a flowchart of a process employed by the electronic form generation system, according to invention principles.

FIG. 8 shows exemplary XML presentation control information for generating an electronic form.

DETAILED DESCRIPTION OF THE INVENTION

Figure 1:
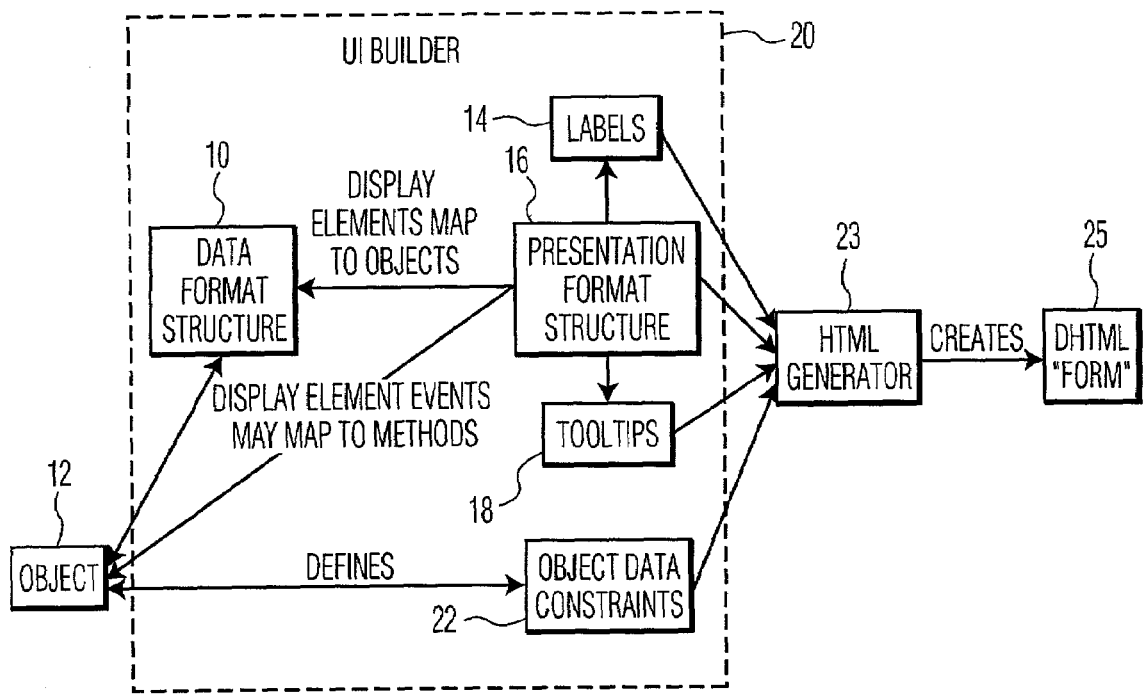
FIG. 1 shows a system for providing code for generating an electronic form that is independent of target display image size and of a target host system, according to invention principles.

FIG. 1 shows a system for providing code for generating an electronic form that is independent of target display image size and independent of a target host system architecture. The system supports defining presentation control information comprising declarative statements for use in generating electronic user interface forms for acquiring data from a user or to display data to a user. The presentation control information is comprised of user defined declarations nested within tables (control groups). The presentation control information advantageously specifies relative location of interface display elements and prompt elements in a display image enabling a generated display image to be quickly adaptively scaled to fit different display image sizes. Because the presentation control information does not specify exact positioning of form image elements (icons, prompts etc), a form is readily adapted to fit any display image size and the form generation system is independent of host system architecture.

The system presentation control information determines the general layout of an electronic form and the data displayed within the form. The system architecture advantageously uses a separate code generator engine for generating code from the presentation control information and other data in a desired code format (e.g., HTML, XML (Extensible Markup Language), SGML (Standardized Generalized Markup Language) etc.). The code generator engine generates code for providing an electronic form based on the presentation control information and additional separately maintained elements including data elements, object data constraints and text (e.g., for form labels or tool tip aids). Because the text labels and tool tip aids are advantageously separate from the presentation control information, they may be readily translated into other languages. Further, the presentation control information is deliberately structured so that it may be easily adapted as system requirements change and evolve. Thereby presentation control information may be easily upgraded and converted by a procedure that processes XML code or by a simple procedure that processes text strings.

FIG. 1 shows a system for providing code for generating an electronic form that is independent of target display image size and independent of a target host system architecture. In the FIG. 1 system, HTML Generator 23 generates DHTML code 25 representing a desired form based on Input data provided by User Interface (UI) builder 20 including presentation control information 16 and ancillary Input data items 14, 18 and 22. HTML (Hyper Text Markup Language) is a markup language for publishing hypertext on the World Wide Web. DHTML (Dynamic HTML) is a more interactive form of HTML. The ancillary input data includes label text 14, tooltip text 18 and data constraints 22. Labels and Tooltip text 14 and 18 are advantageously stored separately from presentation control information 16. This enables text in an output form (represented by code 25) to be translated to other languages without affecting presentation control information 16. Data constraints 22 comprise items associated with prompt elements for display in the output form. Such constraints, for example, include lists of allowable values for data associated with a displayed prompt that are to be retrieved and incorporated into the output form.

HTML Generator 23 uses presentation control information 16 to direct generation of DHTML code 25 representing a desired form. Control information 16 in turn uses information from data format structure 10 that contains data presented in the desired form. Control information 16 also employs objects 12 which may comprise procedures to be executed in response to user selection of display elements or prompt elements displayed in the desired form represented by code 25. Such procedures may determine data constraints 22 to be presented to a user in the desired form or may determine data elements of data format structure 10 also for presentation in the desired form. In other embodiments generator 23 may alternatively generate code representing a form in a selectable code language such as in Visual BASIC, XML, SGML (Standardized Generalized Markup Language), for example, or another code language.

Figure 2:
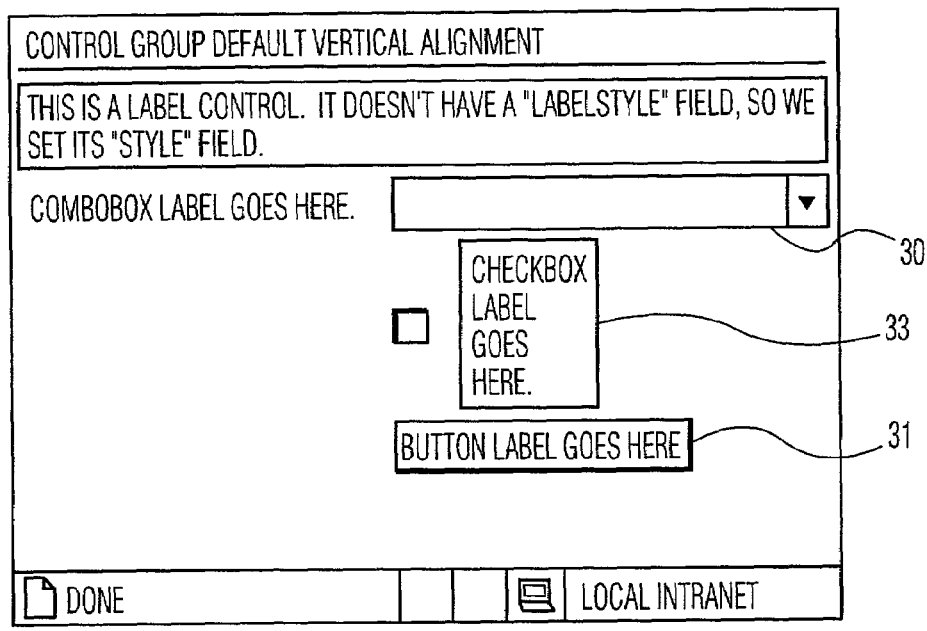
FIG. 2 shows an exemplary electronic form generated by the system of FIG. 1, according to invention principles.

Presentation control information 16 comprises declarative statements determining the presentation display elements that the desired form contains. The presentation control information 16 specifies relative position and size of the display elements in the desired form so that the derived form represented by code 25 is independent of target display image size and target host system architecture. Thereby, a form represented by code 25 is readily adapted for different display image sizes and for use by different system architectures. Control information 16 determines relative positioning of display elements within a desired form and orders and groups the display elements for presentation in the form. Control information 16 defines presentation display elements using items within columnar tables that determine specific properties of individual display elements with a defined set of values. These values determine the look of a form and include, for example, percentage values identifying relative size of display elements. Exemplary XML presentation control information 16 for generating an electronic form as shown in FIG. 2 is given in item 850 in FIG. 8. The exemplary form shown in FIG. 2 comprises 214 lines of DHTML code and displays a data entry prompt element 30, a selectable item prompt 33 and a button 31.

Figure 3:
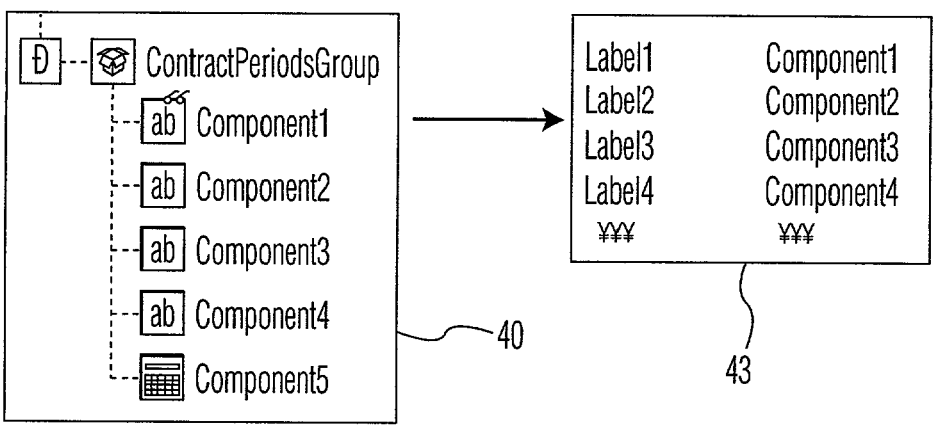
FIG. 3 shows a code structure used in presentation control information employed in generating an electronic form, according to invention principles.
Figure 3:
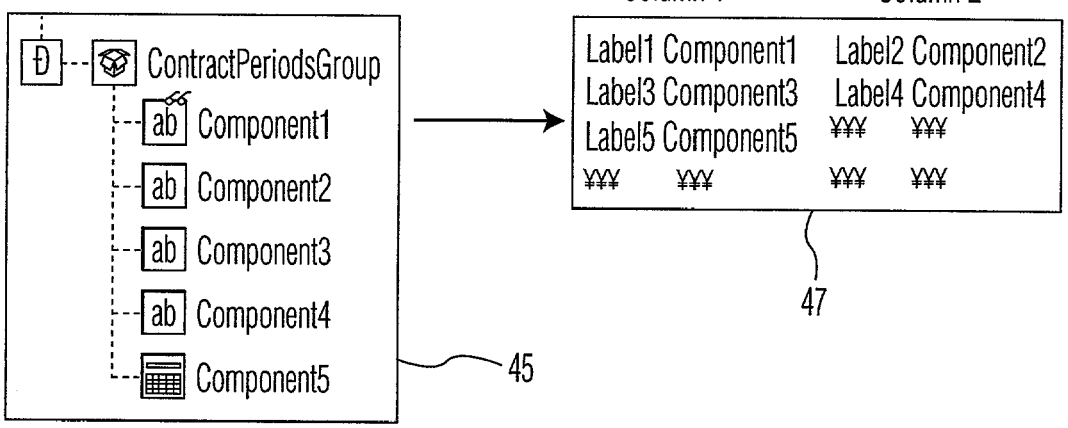

FIG. 3 shows a code structure (a control group) used in presentation control information 16 employed in generating an electronic form. A control group is an HTML table (or in another embodiment another code language table) that contains individual elements for display in a form and also contains other control groups. Control groups within presentation control information 16 (FIG. 1) provide the structure and display characteristics for the entire form. Presentation control information 16 incorporates hierarchically structured control groups (i.e. control groups within control groups within control groups etc). An individual control group comprises multiple columns. In FIG. 3, control group 40 contains a single column 43 and control group 45 contains two columns 47. HTML generator 23 (FIG. 1) places an individual display element and its associated label in the same column. Specifically, HTML generator 23 places individual display elements in an appropriate column and row within a control group by proceeding from left to right and from top to bottom. Consequently, HTML generator 23 fills up each row in a control group until it reaches a limit number of columns specified for the control group prior to filling the next row.

Figure 4:
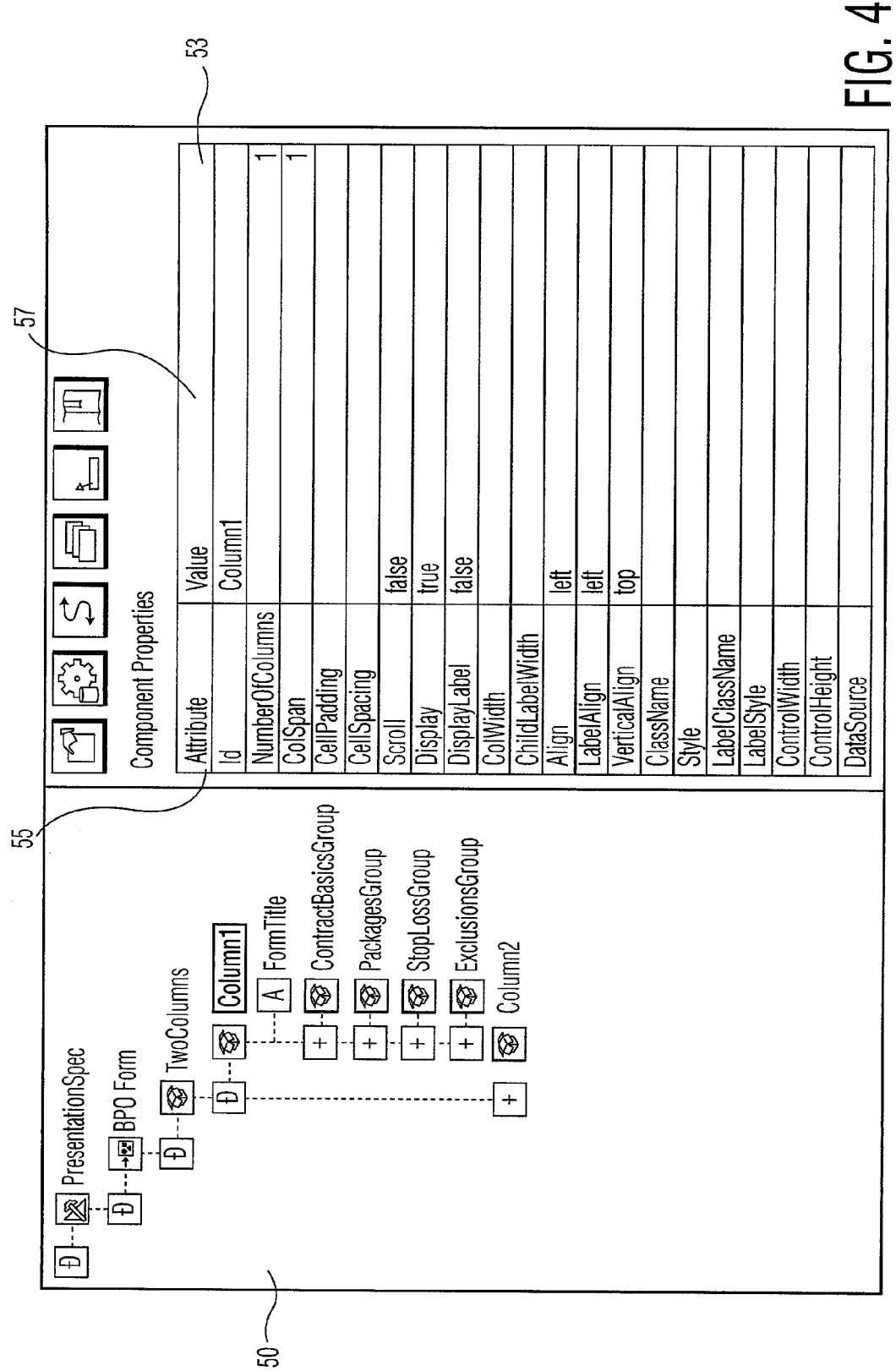
FIG. 4 shows code structure properties used in presentation control information employed in generating an electronic form, according to invention principles.

FIG. 4 shows control group properties for the control groups of FIG. 3 used in presentation control information 16 for generating an electronic form. Properties of a control group of column 1 of FIG. 3 are listed in attributes section 55 of FIG. 4 and associated corresponding property values are given in section 57 within window 53. A hierarchical presentation structure representing control group contents and associated display elements is shown in window 50 of FIG. 4. Typically, a majority of element properties are common to all display elements represented by the control group. Such common properties determine alignment of a display element and its companion label within its container comprising a cell (row/column) of a control group. FIGS. 6A and 6B comprise a table showing common properties of presentation control information 16 employed in generating an electronic form.

Display Element common properties 200-239 of FIGS. 6A and 6B determine alignment of a display element and its companion label in a row and column defined cell within a form. Specifically, the common properties include a display element identifier 200, item 203 determining whether a display element is visible, item 204 determining whether the display element is disabled and item 205 determining whether a label is presented with a display element. The common properties also include a tab index 207, item 209 determining a display element span in number of columns and alignment properties 211, 213, 217 and 219. Specifically, properties 213, 217 and 219 determine alignment of a display element label within a parent display element and property 211 determines alignment of the display element itself within a parent display element. Further, properties 221 and 224 are used to impart a particular style attribute to a display element and properties 227 and 229 are used to impart a particular style attribute to the corresponding display element label. Property 231 determines display element label width and properties 236 and 237 determine display element width and height. Property 239 identifies XOL (XML Query Language) code used to associate data with a disolay element. The XML Query Language (XOL) is used for addressing and filtering the elements and text of XML documents and was proposed in September 1998 to the XSL Working Group. Properties specific to a control group determine spacing of the display elements within the group. The look of a form (represented by code 25 of FIG. 1) is determined by these spacing properties in conjunction with style properties (e.g. specifying borders and color) and alignment properties of individual display elements.

Common properties of FIGS. 6A and 6B advantageously specify display element or label dimensions in terms of a proportion (percentage) of a corresponding dimension of a form. Alternatively, display element and label dimensions are specified as a percentage of a hierarchically encompassing display element which in turn is ultimately specified as a percentage of a corresponding dimension of the form. Specifically, dimensions of individual display elements placed by HTML generator 23 in a particular column and row within a control group are specified by percentages. Thereby, as form size is changed, individual column width changes and form dimensions change proportionally so that the form contents retain relative position in a scaled version of the form. Consequently form elements are independent of an absolute image size and are readily scaled to fit a user selectable image size. Image size may be selected to fit particular display screen requirements or a user may desire a smaller form, for example.

FIG. 5 shows properties of individual control group display elements employed in generating an electronic form. Control group display element properties 100-117 of FIG. 5 determine relative size and alignment of a row and column defined cell determined by the control group and containing display elements for display in a form. Specifically, the display element properties include item 100 determining a number of cells per display image row. The display element properties also include item 103 determining the space (in pixels) between a cell border and its contents and item 107 determining the space (in pixels) between adjacent cells. Property 109 allows DHTML (or other language) styles to be applied to the columns in a control group. This allows for further control of column spacing at top and bottom cell borders, for example. Property 113 determines whether a control group presents displayed horizontal and vertical scrollbars if the display elements represented by the control group exceed a corresponding height or width of the control group. Property 113 alternatively specifies that a control group creates a cell that is of sufficient size to contain the display elements. Property 115 specifies the width of each column of a control group as a proportion (e.g. a percentage) of the space allocated to the control group. Further, property 117 specifies the width of space allocated to individual control group labels as a proportion of the width of the cell assigned to corresponding individual control group display elements.

FIG. 7 shows a flowchart of a process employed by the electronic form generation system of FIG. 1. In step 305 after the start at step 300 the user interface builder 20 (FIG. 1) receives data identifying a desired user interface presentation format suitable for a desired display image size. In step 310, code generator 23 receives data identifying an output code type to be used for providing an executable procedure for generating a user interface form for display (form 25 of FIG. 1). Such an executable procedure code type may comprise HTML (Hyper Text Markup Language) compatible code, XML (Extensible Markup Language) compatible code, SGML (Standardized Generalized Markup Language) compatible code, Visual Basic compatible code and Java compatible code, for example. In step 315 UI builder 20 provides presentation control information (item 16 of FIG. 1) for use in generating a display image of the selected desired user interface presentation format. The presentation control information 16 specifies relative location of display elements (comprising display elements which includes prompt and other elements) and excludes use of data identifying absolute image display element positions in a display image.

In step 320 UI builder 20 scales parameters associated with the relative location and size of the interface display elements determined by presentation control information 16 in order to derive the selected desired user interface presentation format with the desired display image size. In step 323 generator 23 processes presentation control information 16 that specifies relative location and size of the interface display elements (and excluding use of data identifying fixed image display element positions in the display image) to provide the executable procedure of the selected code type. Further, in step 327 generator 23 compiles presentation control information 16 (or in another embodiment interprets presentation control information 16) to provide the executable procedure for use in providing the desired user interface display image. The process of FIG. 7 terminates at step 330.

Returning to FIG. 1, code generator 23 generates code for providing an electronic form based on the presentation control information 16 and additional separately maintained form labels 14 and tool tip aids 18. Presentation control information 16 is language (i.e. French, German etc.) independent because language specific text is stored separately. Code generator 23 associates language specific text with a corresponding display element determined by presentation control information 16 via a display element identifier. Consequently, generator 23 produces different forms in different target languages using common presentation control information 16 and correspondingly different text labels 14 and tool tips 18.

A control group (in presentation control information 16) determining display elements in an electronic form may also be maintained separately (e.g., in structure 10) and referenced from within control information 16. Thereby display elements containing data that differs in format or content (such as address, phone number, date, name) in different countries, for example, may be updated in one place for a specific country without altering control information 16. Following such an update of control group country specific data in unit 10, a form is regenerated by device 23 to provide a form with the desired country specific data. Further, a control group maintained outside of presentation control information 16 (e.g., in unit 10) is reusable if the datasources defined within the control group are associated with one object. In the following example the "Address" control group may be associated with any Address object. Every display element refers to a property associated with an Address.

```
<ControlGroup Id="Address">
    <InputBox Datasource="Address Line 1"/>
    <InputBox Datasource="Address Line 2"/>
    <InputBox Datasource="City"/>
    <ComboBox Datasource="State"/>
    <NumericEdit Datasource="Zip"/>
</ControlGroup>
```

In another example a first control group references an "Address" control group twice (shown as Composite tags). Once for a home Address and once for a work Address.

```
<ControlGroup Id="HomeAndWorkAddress">
    <Composite Id="HomeAddress" DataSource="Patient/HomeAddress"
CompositeSource="Address"/>
    <Composite Id="WorkAddress" DataSource="Patient/WorkAddress"
CompositeSource="Address"/>
</ControlGroup>
```

Display elements determined by presentation control information 16 may be associated with executable procedures in unit 12 that implement desired response actions in response to user activation of associated display elements in form 25. In creating form 25, generator 23 incorporates executable procedure code for a corresponding particular display element in an event handling procedure associated with the particular display element. This enables display element initiated functions to be tailored to desired requirements or enables a default function (associated with activation of a display element) to be replaced with an alternative function. An exemplary event handling procedure for incorporating a procedure to be called upon ZipCode acquisition via a display element follows.

```
<InputBox Id="ZipCode">
    <Events>
        <onchange>
            <Script Id="Script_Zip">
                <![CDATA[
                    . . . place script code here.
                ]]>
            </Script>
        </onclick>
    </Events>
</Button>
```

Additional customization of form 25 is achieved by indicating data elements determining particular selected display elements in presentation control information 16 are to be ignored prior to re-generation of form 25 by unit 23. The selected display elements associated with the ignored data are thereby removed from form 25. In a similar manner, selected data fields associated with particular display elements may be removed from form 25 to tailor a form for a particular user. The form columnar layout determined by presentation control information 16 is not altered. Further customization of form 25 is achieved by modifying control group table contents or property values in presentation control information 16. This may be used to provide a different look to form 25 involving a different display element order or grouping, for example.

In addition, presentation control information 16 is searchable by querying procedures (using XQL or another code language) to search for particular functions or to determine usage of specific procedure items or declarations. For example, an XQL string "Calendar//Script" is used to search presentation control information 16 to identify occurrences of custom script code employed for a Calendar associated display element. Such search strings are used to determine the procedures and properties used in presentation control information 16 to facilitate upgrade and enhancement. The adaptive system of FIG. 1 accommodates different and new versions of generator 23 for creating forms of different syntax (that are not just DHTML compatible) without necessitating alteration of presentation control information 16. Generator 23 may create a textual or binary form representation, for example. This allows forms to be created that readily adapt to hardware and software technology advances. Further, output code 25 is created offline (at design time as opposed to run-time), enabling a form to be created (in control information 16) with as much complexity as desired over an extended period for storage in a client workstation.

The systems and processes presented in FIGS. 1-7 are not exclusive. Other architectures and processes may also be derived in accordance with the principles of the invention to accomplish the same objectives. Further, the inventive principles may be advantageously employed in any systems involving electronic form generation for different display screen sizes.

What is claimed is:

1. An adaptive user interface generator for generating code representing an executable procedure for use in providing a user interface display including a plurality of displayed user interface display elements, comprising:
    a source of presentation control information determining a user interface presentation format of a display image capable of being adaptively scaled to fit different display image sizes, said presentation control information specifying relative location of individual interface display elements in a display image exclusively of fixed position location information said interface display elements; and
    a transformation processor for transforming said presentation control information into executable procedure representative code for use in providing a user interface display image with a format suitable for a desired display size.

2. An interface generator according to claim 1, wherein said source of presentation control information determines said user interface presentation format of said display image.

3. An interface generator according to claim 1, wherein said presentation control information specifies a relative size of said interface display elements enabling scaling of said presentation format to fit different display image sizes, said relative size of said interface display elements being dependent on selected display image size.

4. An interface generator according to claim 3, wherein
    (a) said presentation control information specifies relative location of individual interface display elements by including information specifying a distance between locations of two display elements as a proportion of desired display image size, and
    (b) said presentation control information specifies size of individual interface display elements as a proportion of desired display image size.

5. An interface generator according to claim 1, wherein said presentation control information specifies relative location of said interface display elements by including information specifying a distance between a display element and a display image boundary.

6. An interface generator according to claim 1, wherein said presentation format is allocated a columnar format and said source of presentation control information progressively incorporates said interface display elements in columns in a particular order comprising at least one of, (a) progressing from top to bottom and (b) from one side to the other side.

7. An interface generator according to claim 1, wherein in response to format selection information, said transformation processor transforms said presentation control information into executable procedure representative code comprising a selected language of at least two or, (a) HTML (Hyper Text Markup Language) compatible code, (b) XML (Extensible Markup Langunge) compatible code (c) Visual Basic compatible code and (d) Java compatible code.

8. An interface generator according to claim 7, wherein said transformation processor compiles said executable procedure representative code into machine executable code.

9. An interface generator according to claim 1, wherein said interface display elements include at least one of, (a) a prompt element supporting user entry of data and (b) a displayed item supporting command initiation and (c) a displayed item supporting user menu navigation.

10. An adaptive user interface generator for generating code representing an executable procedure for use in providing a user interface display including a plurality of displayed user interface display elements, comprising:
a source of presentation control information determining a user interface presentation format of a display image capable of being adaptively scaled to fit different display image sizes, said presentation control information specifying relative location of individual interface display elements in a display image, said relative location of individual interface display elements excluding use of data identifying fixed image display element positions in said display image and being independent of image size dependent display element positioning;
presentation display attribute information determining a display attribute of said presentation format; and
a transformation processor using said presentation display attribute information for transforming said presentation control information into code representing an executable procedure for use in providing a user interface display image with a format suitable for a desired display image size.

11. An interface generator according to claim 10, wherein said display attribute of said presentation format determines at least one of, (a) a text label associated with an interface display element, (b) whether a display element is to be omitted from a user interface display and (C) a text label language.

12. An interface generator according to claim 10, wherein said presentation control information determines at least one of (i) positional alignment of an interface display element relative to its associated text label, (ii) relative position of a two different display elements within said presentation format and (iii) relative size of two different display elements within said presentation format.

13. An interface generator according to claim 10, wherein said presentation display attribute information may be updated by a user, via a user interface display, independently of said presentation control information.

14. An interface generator according to claim 10, wherein said presentation control information specifies a relative size of said interface display elements enabling scaling of said presentation format to lit different display image sizes, said relative size of said interface display elements being dependent on selected image size.

15. A method for generating code representing an executable procedure for use in providing a user interface display including a plurality of displayed user interface display elements, comprising the steps of:
selecting a user interface presentation format suitable for a desired display image size;
providing presentation control information for use in generating a display image of said selected user interface presentation format, said presentation control information specifying relative location of said interface display elements excluding use of data identifying absolute image display clement positions in said display image; and
processing said presentation control information to provide code representing an executable procedure for use in providing a user interface display image with said selected user interface presentation format with said desired display image size.

16. A method according to claim 15, including the step of scaling parameters associated with said relative location of said interface display elements determined by said presentation control information to derive said selected user interface presentation format with said desired display image size.

17. A method according to claim 15, including the step of scaling parameters determining a relative size of said interface display elements determined by said presentation control information to derive said selected user interface presentation format with said desired display image size.

18. A method according to claim 15, wherein
said step of processing said presentation control information comprises at least one of, (a) compiling said presentation control information and (b) interpreting said presentation control information, to provide said executable procedure for use in providing said user interface display image.

19. A method for providing code for providing a user interface display image including a plurality of displayed user interface display elements, comprising the steps of:
selecting a code type for implementing an executable procedure for providing a user interface display image of a desired display image size;
processing presentation control information to provide a code representative procedure representing said executable procedure of said selected code type, said presentation control information specifying relative location of said interface display elements and excluding use of data identifying fixed image display element positions in said display image; and
storing said generated code representative procedure.

20. An interface generator according to claim 19, wherein said selecting step includes selecting a code type comprising at least one of, (a) HTML (Hyper Text Markup Language) compatible code, (b) XML (Extensible Markup Language) compatible code (c) Visual Basic compatible code and (d) Java compatible code.

21. An interface generator according to claim 19, including the step of
compiling said code representative procedure into machine executable code.

22. An interface generator according to claim 19, including the step of
interpreting said code representative procedure into machine executable code.

23. A method according to claim 19, including the step of sealing parameters determining a relative size of said interface display elements in providing said code representative procedure.

* * * * *